US008482264B2

(12) United States Patent
Liu

(10) Patent No.: US 8,482,264 B2
(45) Date of Patent: Jul. 9, 2013

(54) FAST CHARGER FOR SUPER CAPACITOR

(75) Inventor: Chenyang Liu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 357 days.

(21) Appl. No.: 13/054,539

(22) PCT Filed: Jul. 3, 2009

(86) PCT No.: PCT/IB2009/053021
§ 371 (c)(1),
(2), (4) Date: Jan. 17, 2011

(87) PCT Pub. No.: WO2010/010478
PCT Pub. Date: Jan. 28, 2010

(65) Prior Publication Data
US 2011/0121793 A1 May 26, 2011

(30) Foreign Application Priority Data

Jul. 23, 2008 (CN) .......................... 2008 1 0142967

(51) Int. Cl.
*H01M 10/46* (2006.01)
(52) U.S. Cl.
USPC ........................................................ 320/167
(58) Field of Classification Search
USPC ................. 320/107, 125, 127, 128, 160, 166, 320/167
See application file for complete search history.

(56) References Cited

U.S. PATENT DOCUMENTS

| 4,388,582 A | 6/1983 | Saar |
| 4,426,612 A | 1/1984 | Wicnienski |
| 4,609,861 A | 9/1986 | Inaniwa |
| 5,475,294 A | 12/1995 | Isoda |
| 5,637,981 A | 6/1997 | Nagai |
| 5,710,506 A | 1/1998 | Broell |
| 5,783,928 A | 7/1998 | Okamura |
| 5,821,736 A | 10/1998 | Yeon |
| 5,969,505 A | 10/1999 | Okamura |
| 6,516,153 B2 | 2/2003 | Honda |
| 6,956,358 B2 | 10/2005 | Yu |
| 7,034,580 B2 | 4/2006 | Yano |
| 7,148,658 B2 | 12/2006 | Yu |
| 2004/0124811 A1 | 7/2004 | Kok |
| 2008/0048499 A1* | 2/2008 | Litovsky et al. ................ 307/45 |
| 2010/0026248 A1* | 2/2010 | Barrade et al. ................ 320/166 |

* cited by examiner

*Primary Examiner* — Edward Tso
(74) *Attorney, Agent, or Firm* — Larry Liberchuk

(57) ABSTRACT

This invention proposes a novel charging method for improving the efficiency of charging a super capacitor. The method comprises the steps of: charging the super capacitor with a first current; measuring a voltage of the super capacitor; stopping the supply of the first current when the measured voltage reaches a pre-defined voltage value; monitoring a voltage variation of the super capacitor; charging the super capacitor with a second current when the monitored voltage variation exceeds a pre-defined threshold within a pre-defined period. By using said two-phase charging, especially when using two different charging currents, it is easier to improve the charging efficiency without degrading the charging speed.

11 Claims, 3 Drawing Sheets

FAST CHARGER FOR SUPER CAPACITOR

TECHNICAL FIELD OF THE INVENTION

The present invention relates to methods and apparatus for charging a super capacitor.

BACKGROUND OF THE INVENTION

In current daily life, batteries are widely used to provide energy to consumer products, especially portable products. Among them, rechargeable batteries, including NiCd, NiMh, Li-ion and lead-acid batteries, are popular because of their advantage of rechargeability. However, these rechargeable batteries still have several disadvantages. First, recharging cycles are limited. For example, NiCd batteries normally have 1000 recharging cycles with memory effect, NiMH batteries have 500 recharging cycles and a high self-discharge rate, Li-ion batteries have 300~500 recharging cycles. Second, the needed charging time is rather long. Normally one to several hours is needed to fully charge a battery. This limits mobility, especially for portable devices, due to the need of a connection between the battery and a fixed energy source.

Another kind of energy storage, i.e. a super capacitor, has been developed which has remarkable advantages, especially the approximately unlimited number of recharging cycles and the instant charging capability. For example, a super capacitor has more than 500,000 recharging cycles, and for each charging only a few seconds to a few minutes is needed.

However, super capacitors suffer a rapid voltage drop upon disconnecting them from a charger. A super capacitor normally is a parallel connection of a plurality of capacitors. FIG. 1 illustrates an exemplary charge model of a super capacitor, wherein, $C_0, C_1, \ldots,$ and $C_n$ are capacitors, $R_0, R_1, \ldots, R_n$, and $R_P$ are major series resistances of the super capacitor, $R_s$ is the contact resistance between the charger and the super capacitor, and V is the measured voltage across the super capacitor by a voltmeter. The voltage across the super capacitor can be calculated as:

$$V_{s-c} = V - i*R_s \quad (1)$$

And the voltage across an internal capacitor, for example, $C_0$, can be calculated as:

$$V_{c0} = V - i*R_s - i_1*R_0 \quad (2)$$

From equations (1) and (2), it is easy to see that the real voltages across the super capacitor and internal capacitors should be $V_{s-c}, V_{c0}$, etc. And the actual stored energy $$\left(E = \frac{1}{2}C*V^2\right)$$

is determined by the capacitance of $C_0, C_1, \ldots, C_n$ and the corresponding voltages $V_{C0}, V_{C1}, \ldots, V_{Cn}$.

Normally the super capacitor can be charged with either constant current or constant power. The charging stops upon the measured voltage V reaching a rated voltage $V_{rated}$. FIG. 2 depicts the voltage drop phenomenon. First, due to the existence of contact resistance $R_s$ during charging, a first voltage drop $V_f$ occurs when charging stops. Second, due to the diffusion process, such as the equilibration of excess ionic concentration, a second rapid voltage drop $V_d$ occurs in a short period after the charging stops. For a better understanding, the diffusion process is described below. When a super capacitor is being charged, at least two processes occur near the surface of the carbon. The first process is an increase in the number of ions forming the double-layer at the carbon surface. The second process is a local increase in ionic concentration, at or near the carbon surface, which is not directly related to the double-layer. When the super capacitor disconnects from the charging circuit and undergoes self-discharging, then, apart from charge leakage due to imperfections and impurities in the double-layer, the double-layer charge will stay in place but the excess ionic concentration near the carbon surface will diffuse to an equilibrium state. Some of the ions will diffuse into the electrolyte and others will diffuse to the carbon surface where they reduce the number of excess charges in the carbon and, hence, decrease the open-circuit voltage of the capacitor.

Due to the existence of $V_f$ and $V_d$, the actual voltage across the super capacitor and its internal capacitors cannot reach the rated voltage $V_{rated}$, which further contributes to the actual stored energy being smaller than the rated energy $$E_{rated} = \frac{1}{2}C*V^2$$

of the super capacitor. If the overall voltage drops about 10%, about 19% less energy is stored than rated.

Thus, there is a need to improve the charging efficiency for charging super capacitors.

SUMMARY OF THE INVENTION

It is an object, according to an embodiment of the present invention, to improve the charging efficiency for charging a super capacitor.

According to an embodiment, a method of charging a super capacitor is provided. The method comprises the steps of: charging the super capacitor with a first current; measuring a voltage of the super capacitor; stopping the supply of the first current when the measured voltage reaches a pre-defined voltage value; monitoring a voltage variation of the super capacitor; charging the super capacitor with a second current when the monitored voltage variation exceeds a pre-defined threshold within a pre-defined period.

The basic idea behind the method is to use two different currents to charge the super capacitor at two different stages; particularly, the second current is smaller than the first current. The inventor has realized that, the larger the charging current, the larger the first voltage drop $V_f$ and the larger the second voltage drop $V_d$ within a period of time. To maintain the advantage of "instant charging capacity" of the super capacitor, the larger first current is used to shorten the charging time for reaching the pre-defined voltage value, for example, the rated voltage. When the voltage variation across the super capacitor exceeds the pre-defined threshold within the pre-defined period, the smaller second current is used to re-charge the super capacitor to reach the pre-defined voltage value. Since the second current is quite small, the voltage across the contact resistance $R_s$, which later appears as the first voltage drop $V_f$, is quite limited, and the diffusion speed of the diffusion process is quite slow, which further causes the second voltage drop $V_d$ to be quite limited. Meanwhile, due to the fact that the monitored voltage variation is much smaller than the pre-defined voltage value, the needed charging time using the second current is quite short. Thus, by using the two-phase charging method, the super capacitor can be charged effectively and efficiently, especially with respect to charged voltage and stored energy.

In an embodiment, the predefined threshold is in the range of 4%~20% of the pre-defined voltage value, preferably 8%.

In an embodiment, the pre-defined period is in the range of 0.1 s~5 s, preferably 1 s.

In an embodiment, the ratio of the first and the second currents is in the range of 5 to 15, preferably 10.

These and other aspects, features and/or advantages of the invention will be apparent from and elucidated with reference to the embodiments described hereinafter.

BRIEF DESCRIPTION OF THE DRAWINGS

For a more complete understanding of the present invention, and the advantages thereof, reference is now made to the following descriptions given in conjunction with the accompany drawing, in which.

DETAILED DESCRIPTION OF THE EMBODIMENTS

Figure 1:
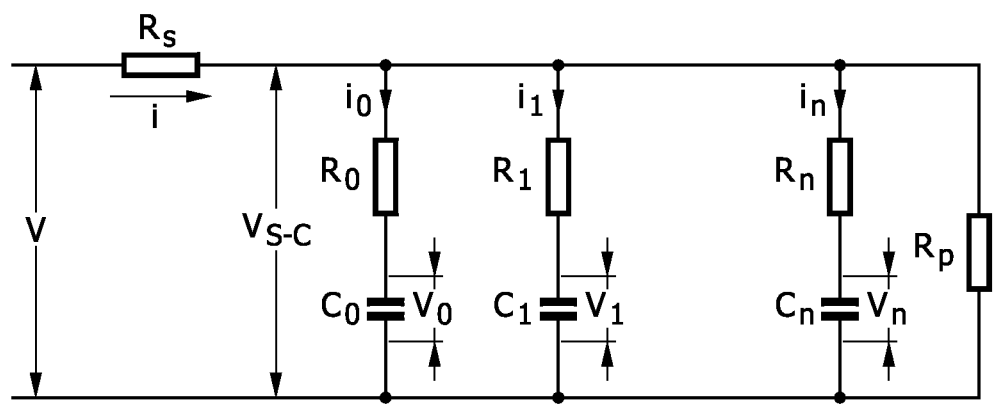
FIG. 1 illustrates a charge model of a super capacitor.
Figure 2:
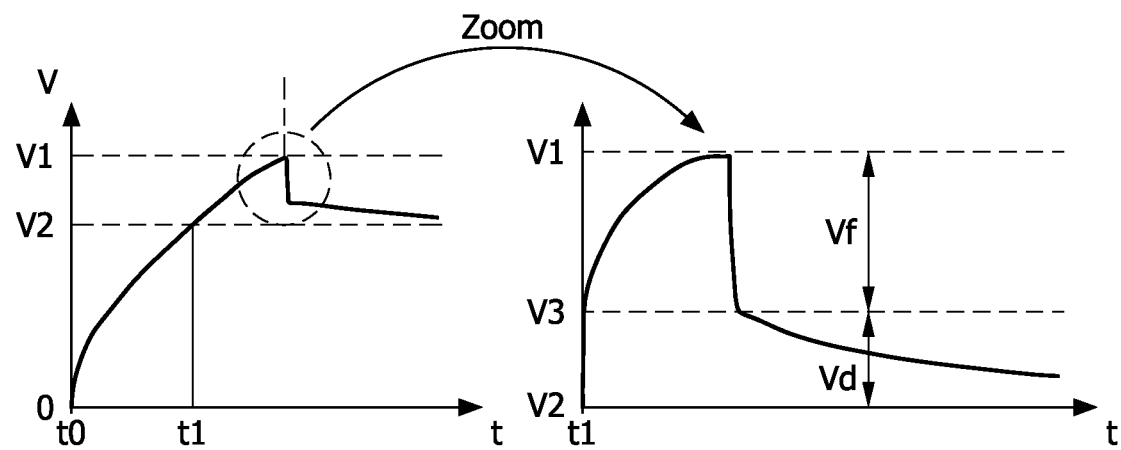
FIG. 2 illustrates the phenomenon of voltage drop.
Figure 3:
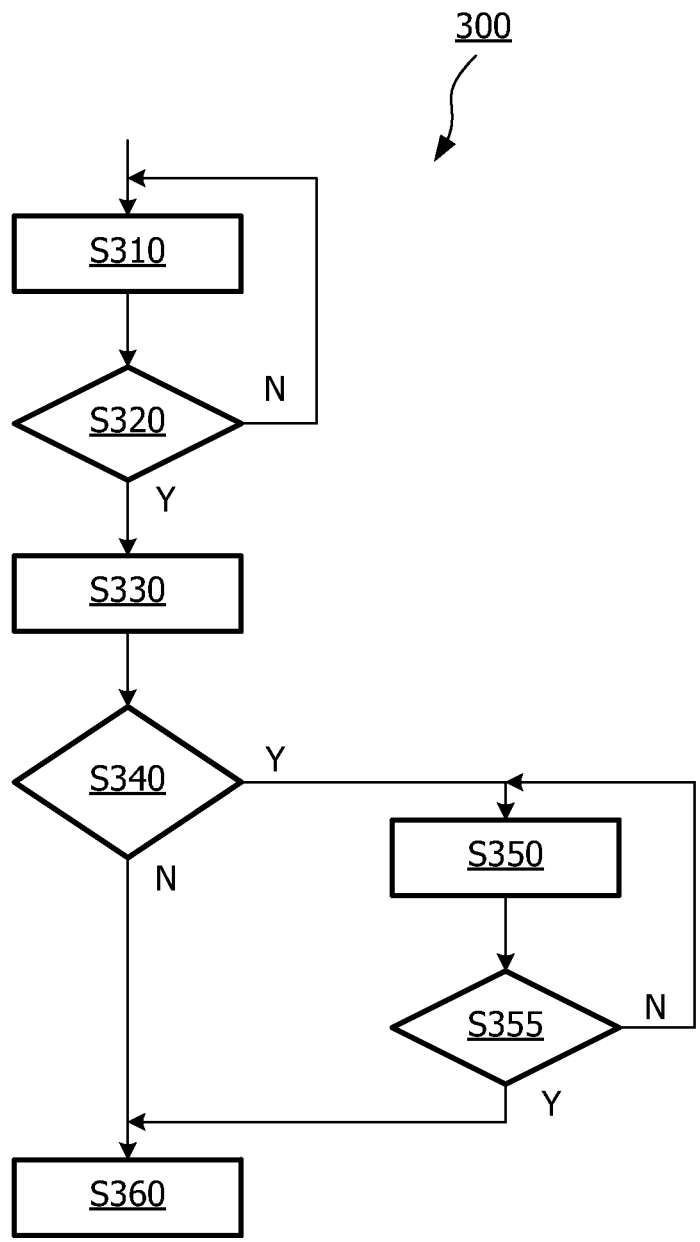
FIG. 3 illustrates the flow chart of a proposed method, according to an embodiment of the invention.

To improve the charging efficiency, according to an embodiment, there is provided a charging method, referred to as two-phase charging strategy. The method 300 comprises a first step S310, in which charging the super capacitor with a first current takes place. During the charging process, the voltage across the super capacitor is measured. In a further step S320, it is judged whether the measured voltage reaches a pre-defined voltage value. The pre-defined voltage value can be the rated voltage of the super capacitor, or alternatively a voltage larger than the rated voltage, with the risk of shortening the lifetime of the super capacitor, or a voltage lower than the rated voltage, with the benefit of extending the lifetime. If the measured voltage is lower than the pre-defined voltage value, then charging with the first current continues.

If the measured voltage reaches, or is larger than, the pre-defined voltage value, in step S330, the charging stops, while measuring the voltage across the super capacitor is continued for a predefined period. The factors determining the pre-defined period can be the value of the first current, the capacitance of the super capacitor, tolerated voltage drop, etc. In step S340, it is judged whether the measured voltage variation exceeds a pre-defined threshold within a pre-defined period. The measured voltage variation is the variation between the pre-defined voltage value and the current measured voltage across the super capacitor. The pre-defined threshold and the pre-defined period are affected by the tolerance of users to insufficient charging of the super capacitor and the time spent on charging. If the user is not so sensitive to the charge status of the super capacitor, the pre-defined threshold can be larger, otherwise it should be smaller. In an embodiment, the pre-defined threshold can be in the range of 4%~20% of the pre-defined voltage value, preferably 8%. For example, if the pre-defined voltage value is 2.5 V, the pre-defined threshold can preferably be 0.2V. The pre-defined monitoring period can be in the range of 0.1 s~10 s, preferably 1 s, which maintains the advantage of "instant charge capability" of the super capacitor. If the monitored voltage variation exceeds the pre-defined threshold within the pre-defined period, the method goes to step S350 to re-charge the super capacitor with a second current. The ratio of the first current to the second current can be in the range of 5~15, preferably 10. If within the pre-defined period, the monitored voltage variation does not reach the pre-defined threshold, the charge process stops in step S360. In the second charging phase, the voltage across the super capacitor is also measured. When the super capacitor is re-charged and reaches the pre-defined voltage value in step S355, the charge process stops.

The two-phase charging strategy can be extended to a three-phase or four-phase charging strategy. For example, for a super capacitor with a very large capacitance which needs a fairly large current to charge it, it is possible to use a three-phase charging method. Therein, in the second charging phase, a fairly large second current results in the corresponding fast diffusion process, which further results in a considerable voltage drop $V_d$. So, when the super capacitor is re-charged so as to reach the pre-defined voltage value, steps similar to S330 and S340 are still needed to judge whether the monitored voltage variation exceeds the pre-defined threshold within the pre-defined period. If so, a third charging phase is initiated with a third current, which is smaller than the second charging current.

Figure 4:
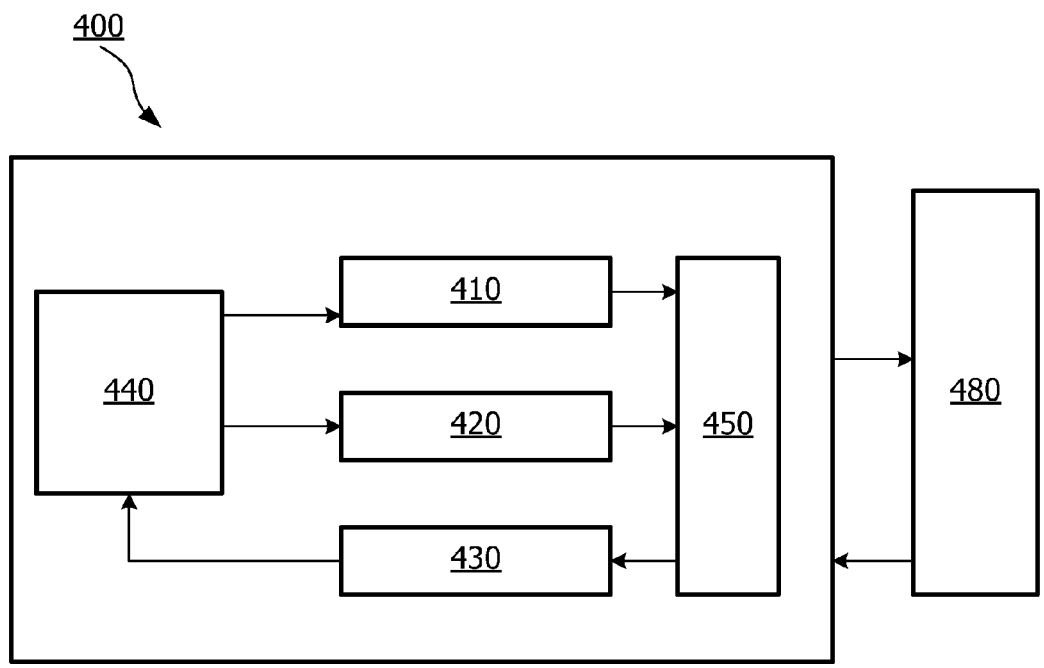
FIG. 4 illustrates the block diagram of a proposed charger, according to an embodiment of the invention.

FIG. 4 illustrates, according to an embodiment, a block diagram of a charger for charging a super capacitor. The charger 400 comprises a first charging module 410, a second charging module 420, a voltmeter 430 and a processor 440. In this embodiment, the first charging module 410 is configured to charge the super capacitor 480 with a first current, the second charging module 420 is configured to charge the super capacitor 480 with a second current, the voltmeter 430 is configured to measure a voltage of the super capacitor 480, and the processor 440 is configured to compare a voltage variation of the super capacitor 480 within a pre-defined period with a predefined voltage threshold, and to select one of the first charging module 410 and the second charging module 420 to charge the super capacitor 480. Optionally, the charger 400 can further comprise a multiplexer 450, which is configured to multiplex the interfaces of the first charging module 410 and the second charging module 420, so as to provide a single interface to the super capacitor 480. It is also possible to multiplex the interface between the voltmeter 430 and the super capacitor 480 with the interface between the two charging modules and the super capacitor 480.

Figure 5:
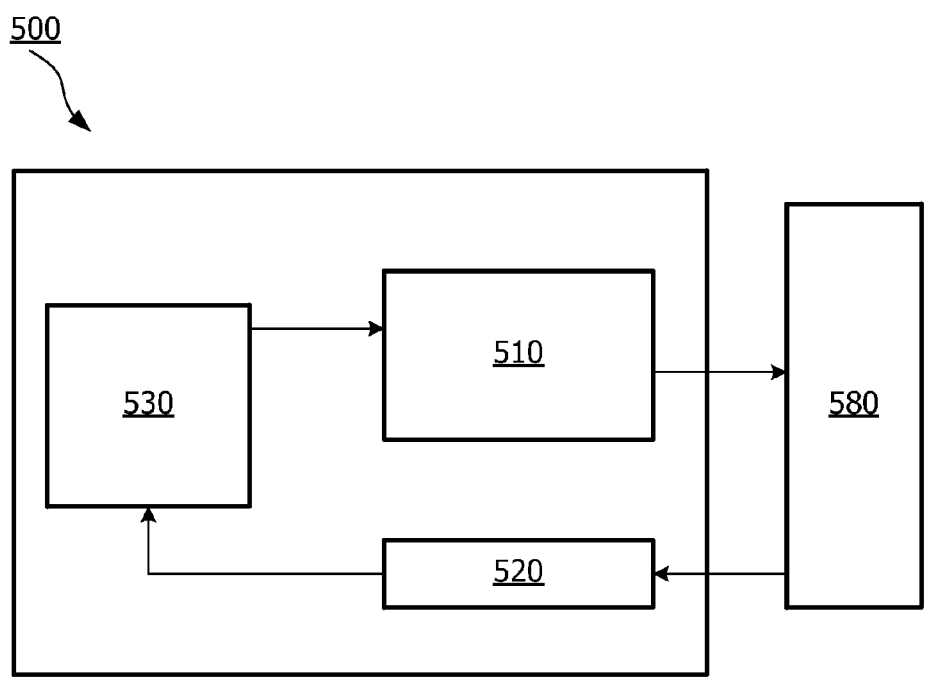
FIG. 5 illustrates the block diagram of a proposed charger, according to an embodiment of the invention.

FIG. 5 illustrates, according to an embodiment, a block diagram of a charger for charging a super capacitor.

The charger 500 comprises a charging module 510, a voltmeter 520 and a controller 530. In this embodiment, the charging module 510 is configured to adapt charging currents, depending on a received control signal, to charge a super capacitor 580, the voltmeter 520 is configured to measure a voltage of the super capacitor 580, and the controller 530 is configured to compare a voltage variation of the super capacitor 580 within a pre-defined period with a predefined voltage threshold, and to output the control signal to control the charging module 510 selecting a corresponding charging current. In the first charging stage, the controller 530 can output a control signal to notify the charging module 510 to charge the super capacitor 580 with a first current. While in the second charging stage, i.e., the measured voltage variation exceeds the pre-defined threshold within the pre-defined period, the controller 530 sends another control signal to notify the charging module 510 to charge the super capacitor with a second current.

It will be appreciated by those skilled in the art that various modifications are possible in the method and apparatus thereof provided in the various embodiments of the invention, without departing from the spirit or scope of the invention. Therefore, the scope of the invention will be limited only by the appended claims.

The remarks made hereinbefore demonstrate that the detailed description with reference to the drawings, illustrates rather than limits the invention. There are numerous alternatives, which fall within the scope of the appended claims. Any reference sign in a claim should not be construed as limiting the claim. The word "comprising" does not exclude the presence of elements or steps other than those listed in a claim. The word "a" or "an" preceding an element or step does not exclude the presence of a plurality of such elements or steps.

The invention claimed is:

1. A method of charging a super capacitor, the method comprising the steps of:
   a) charging the super capacitor with a first current;
   b) measuring a voltage of the super capacitor;
   c) stopping the supply of the first current when the measured voltage reaches a pre-defined voltage value;
   d) monitoring a voltage variation of the super capacitor;
   e) charging the super capacitor with a second current when the monitored voltage variation exceeds a pre-defined threshold within a pre-defined period.

2. A method as claimed in claim 1, further comprising the step of:
   f) stopping the supply of the second current when the measured voltage reaches the pre-defined voltage value.

3. A method as claimed in claim 1, wherein the pre-defined period is in the range of 0.1 s~10 s.

4. A method as claimed in claim 3, wherein the pre-defined period is preferably 5 s.

5. A method as claimed in claim 1, wherein the ratio of the first current over the second current is in the range of 5 to 15.

6. A method as claimed in claim 5, wherein the ratio of the first current to the second current is preferably 10.

7. A method as claimed in claim 1, wherein the ratio of the pre-defined threshold to the pre-defined voltage value is in the range of 4%~20%, with a preferred value of 8%.

8. A method as claimed in claim 7, wherein the ratio of the pre-defined threshold to the pre-defined voltage value is preferably 8%.

9. A charger for charging a super capacitor, the charger comprising:
   a first charging module (410), configured to charge the super capacitor (480) with a first current;
   a second charging module (420), configured to charge the super capacitor with a second current;
   a voltmeter (430), configured to measure a voltage of the super capacitor;
   a processor (440), configured to compare a voltage variation of the super capacitor within a pre-defined period with a predefined voltage threshold, and to select one of the first charging module (410) and the second charging module (420) to charge the super capacitor.

10. A charger as claimed in claim 9, further comprising:
    a multiplexer (450), configured to multiplex the interfaces of the first charging module and the second charging module, so as to provide a single interface to the super capacitor.

11. A charger for charging a super capacitor, the charger comprising:
    a charging module (510), configured to adapt charging currents, depending on a received control signal, to charge the super capacitor (580);
    a voltmeter (520), configured to measure a voltage of the super capacitor; and
    a controller (530), configured to compare a voltage variation of the super capacitor within a pre-defined period with a pre-defined voltage threshold, and to output the control signal to control the charging module (510) selecting a corresponding charging current.

* * * * *